United States Patent
Stein

(10) Patent No.: US 12,181,619 B2
(45) Date of Patent: Dec. 31, 2024

(54) METHOD FOR DETERMINING THE NEUTRON FLUX BY USING A PORTABLE RADIONUCLIDE IDENTIFICATION DEVICE (RID) COMPRISING SCINTILLATION MATERIAL WITH IODINE

(71) Applicant: TARGET SYSTEMELEKTRONIK GMBH & CO. KG, Wuppertal (DE)

(72) Inventor: Jurgen Stein, Wuppertal (DE)

(73) Assignee: TARGET SYSTEMELEKTRONIK GMBH &CO. KG, Wuppertal (DE)

( * ) Notice: Subject to any disclaimer, the term of this patent is extended or adjusted under 35 U.S.C. 154(b) by 150 days.

(21) Appl. No.: 17/901,536

(22) Filed: Sep. 1, 2022

(65) Prior Publication Data
US 2023/0003910 A1    Jan. 5, 2023

Related U.S. Application Data

(63) Continuation of application No. PCT/EP2020/055875, filed on Mar. 5, 2020.

(51) Int. Cl.
*G01T 3/06* (2006.01)
*G01V 5/26* (2024.01)

(52) U.S. Cl.
CPC . *G01T 3/06* (2013.01); *G01V 5/26* (2024.01)

(58) Field of Classification Search
None
See application file for complete search history.

(56) References Cited

U.S. PATENT DOCUMENTS

| | | | |
|---|---|---|---|
| 2,982,860 | A | 5/1961 | Nehrbas |
| 3,089,955 | A | 5/1963 | Scherbatskoy |
| 3,171,032 | A | 2/1965 | Holt |
| 3,184,597 | A | 5/1965 | Scherbatskoy |
| 3,428,804 | A | 2/1969 | Comunnetti |
| 3,515,878 | A | 6/1970 | Ried, Jr. |
| 3,922,541 | A | 11/1975 | Seeman |
| 4,272,677 | A | 6/1981 | Berthold |

(Continued)

FOREIGN PATENT DOCUMENTS

| | | |
|---|---|---|
| CN | 201021941 | 2/2008 |
| CN | 101939783 | 1/2011 |

(Continued)

OTHER PUBLICATIONS

International Search Report issued for International Patent Application No. PCT/EP2020/055875, mailed on Oct. 15, 2020.

(Continued)

*Primary Examiner* — David P Porta
*Assistant Examiner* — Djura Malevic
(74) *Attorney, Agent, or Firm* — Novel IP

(57) ABSTRACT

A method for determining neutron flux by utilizing a portable Radionuclide Identification Device (RID) as it is used in homeland security applications is provided. The RID has an inorganic crystal comprising iodine, a light detector and electronics for the evaluation of the output signals of the light detector. The method includes a step of detecting, with the light detector, light emitted by the crystal following the interaction of nuclear radiation with the crystal. The intensity of the light measured is a function of the energy deposed in the crystal by said nuclear radiation during the interaction with the crystal.

12 Claims, 1 Drawing Sheet

(56) References Cited

U.S. PATENT DOCUMENTS

| | | | |
|---|---|---|---|
| 4,618,775 | A | 10/1986 | Persyk |
| 4,717,825 | A | 1/1988 | Smith, Jr. |
| 4,820,914 | A | 4/1989 | Allen |
| 4,883,956 | A | 11/1989 | Melcher |
| 4,918,314 | A | 4/1990 | Sonne |
| 5,079,424 | A | 1/1992 | Kobayashi |
| 5,198,670 | A | 3/1993 | Vancauter |
| 5,218,202 | A | 6/1993 | Evers |
| 5,360,975 | A | 11/1994 | Stoller |
| 5,548,111 | A | 8/1996 | Nurmi |
| 5,600,135 | A | 2/1997 | Jacobson |
| 5,866,907 | A | 2/1999 | Drukier |
| 6,021,341 | A | 2/2000 | Scibilia |
| 6,087,656 | A | 7/2000 | Kimmich |
| 7,005,646 | B1 | 2/2006 | Jordanov |
| 7,157,681 | B1 | 1/2007 | Tetzlaff |
| 7,253,761 | B1 | 8/2007 | Hoyos |
| 7,480,362 | B2 | 1/2009 | Carmi |
| 9,269,552 | B2 | 2/2016 | Steiner |
| 9,864,076 | B2 | 1/2018 | Stein |
| 10,048,393 | B2 | 8/2018 | Stein |
| 10,061,041 | B2 | 8/2018 | Rowland et al. |
| 10,520,612 | B2 | 12/2019 | Stein |
| 10,527,742 | B2 | 1/2020 | Stein |
| 11,105,940 | B2 * | 8/2021 | Iwatschenko-Borho ................. G01T 3/065 |
| 11,163,076 | B2 | 11/2021 | Stein |
| 11,448,777 | B2 | 9/2022 | Stein |
| 11,693,134 | B2 * | 7/2023 | Behar ................. G01T 1/2023 250/362 |
| 2004/0016867 | A1 | 1/2004 | Milshtein |
| 2005/0258371 | A1 | 11/2005 | Stein |
| 2006/0081786 | A1 | 4/2006 | Berthold |
| 2006/0126776 | A1 | 6/2006 | Izumi |
| 2006/0289775 | A1 | 12/2006 | Inbar |
| 2007/0013899 | A1 | 1/2007 | Wolters |
| 2009/0146073 | A1 | 6/2009 | Stein |
| 2009/0230285 | A1 | 9/2009 | Wright |
| 2009/0272910 | A1 | 11/2009 | Grynyov |
| 2010/0020922 | A1 | 1/2010 | Carmi |
| 2010/0065746 | A1 | 3/2010 | Grazioso |
| 2010/0090114 | A1 | 4/2010 | Bauer |
| 2011/0031405 | A1 | 2/2011 | Kulik |
| 2011/0091207 | A1 | 4/2011 | Xie |
| 2011/0101230 | A1 | 5/2011 | Inbar |
| 2011/0182407 | A1 | 7/2011 | Morton |
| 2011/0186740 | A1 | 8/2011 | Normand |
| 2011/0211675 | A1 | 9/2011 | Ramsden |
| 2012/0175514 | A1 | 7/2012 | Izumi |
| 2012/0305783 | A1 | 12/2012 | Gagnon |
| 2012/0314827 | A1 | 12/2012 | Dioszegi |
| 2013/0256520 | A1 | 10/2013 | Korkin |
| 2014/0061488 | A1 | 3/2014 | Sato |
| 2014/0077073 | A1 | 3/2014 | Vu |
| 2014/0084149 | A1 | 3/2014 | Stoller |
| 2014/0151529 | A1 | 6/2014 | Steiner |
| 2014/0151549 | A1 | 6/2014 | Steiner |
| 2014/0348286 | A1 * | 11/2014 | Rowland ................. G01T 3/00 376/254 |
| 2015/0162174 | A1 | 6/2015 | Badiei |
| 2015/0212218 | A1 | 7/2015 | Manslow |
| 2015/0247938 | A1 | 9/2015 | Penumadu |
| 2015/0327827 | A1 | 11/2015 | Teshigawara |
| 2016/0003671 | A1 | 1/2016 | Fontbonne |
| 2016/0223494 | A1 | 8/2016 | Steiner |
| 2016/0291196 | A1 * | 10/2016 | De Vita ................. G01V 5/281 |
| 2016/0372309 | A1 | 12/2016 | Steiner |
| 2017/0227659 | A1 | 8/2017 | Stein |
| 2018/0275309 | A1 | 9/2018 | Berheide |
| 2019/0212458 | A1 * | 7/2019 | Iwatschenko-Borho ................. G01T 3/065 |
| 2022/0326401 | A1 * | 10/2022 | Aronkytö ................. G01T 1/204 |

FOREIGN PATENT DOCUMENTS

| | | |
|---|---|---|
| DE | 2826484 | 12/1979 |
| DE | 10209161 | 9/2003 |
| EP | 2354809 | 8/2011 |
| EP | 3401706 A1 | 11/2018 |
| GB | 2023814 | 1/1980 |
| JP | S5819024 | 4/1983 |
| JP | H0197892 | 4/1989 |
| JP | 2002357692 | 12/2002 |
| RU | 2 276 352 C2 | 5/2006 |
| WO | 9002415 | 3/1990 |
| WO | 2011/012155 A1 | 2/2011 |
| WO | 2012080443 | 6/2012 |
| WO | 2013116241 A1 | 8/2013 |
| WO | 2014136990 | 9/2014 |
| WO | 2016066185 | 5/2016 |
| WO | 2017/202793 A1 | 11/2017 |
| WO | 2017/202793 A9 | 11/2017 |

OTHER PUBLICATIONS

Bartle et al., "Small inorganic scintillators as neutron detectors," Nuclear Instruments and Methods in Physics Research, Section A, pp. 54-58, Elsevier Science B.V., 1999.

Holm et al., "Neutron detection with a NaI spectrometer using high-energy photons," Nuclear Instruments and Methods in Physics Research, Section A, pp. 59-63, Elsevier Science B.V., Sep. 12, 2012.

Pausch et al., "Neutron detection based on capture-gamma sensing and calorimetry," Active and Passive Signatures III, Proc. of SPIE, vol. 8382, 838209, SPIE, 2012.

Yakushev et al., "Sensitive neutron detection method using delayed coincidence transitions in existing iodine-containing detectors," Nuclear Instruments and Methods in Physics Research, Section A, pp. 162-165, Elsevier Science B.V., Dec. 15, 2016.

International Search Report for corresponding International Application No. PCT/EP2015/060390 dated Aug. 31, 2015.

International Search Report for corresponding International Application No. PCT/EP2015/060384 dated Aug. 26, 2015.

Chen C et al, "Front-end electronics for the CDF-II time-of-flight system", IEEE Transactions on Nuclear Science, IEEE Service Center, New York, NY, US, (Dec. 1, 2003), vol. 50, No. 6, doi:10.1109/TNS.2003.820632, ISSN 0018-9499, pp. 2486-2490, XP011106678.

International Search Report issued for International Patent Application No. PCT/EP2015/074282 dated Jun. 28, 2016.

Chen et al.: "Front-end electronics for the CDF-II time-of-flight system", IEEE Transactions on Nuclear Science, vol. 50, No. 6, pp. 2486-2490, IEEE Service Center, New York, NY, Dec. 1, 2003.

International Search Report with a Written Opinion issued for corresponding International Application No. PCT/EP2014/073037 dated Jul. 24, 2015.

[Xai]—Wen Xianfei et al, "Measuring the scintillation decay time for different energy deposited by [gamma]-rays and neutrons in a Cs2LiYCl6:Ce3+detector", Nuclear Instruments & Methods in Physics Research. Section A: Accelerators, Spectrometers, Detectors, and Associated Equipment, Elsevier BV * North-Holland, NL, (Feb. 9, 2017), vol. 853, doi:10.1016/J.NIMA.2017.02.019, ISSN 0168-9002, pp. 9-15, XP029936730.

Kyle Polack et al. "Dual-Particle Imager for Standoff Detection of Special Nuclear Material", IEEE Nuclear Science Symposium Conference Record, Oct. 23, 2011, pp. 1494-1500, IEEE.

Soundara-Pandian L et al, "Lithium Alkaline Halides-Next Generation of Dual Mode Scintillators", IEEE Transactions on Nuclear Science, IEEE Service Center, New York, NY, US, vol. 63, No. 2, doi: 10.1109/TNS.2016.2535355, Issn 0018-9499, (Apr. 1, 2016), pp. 490-496, (Apr. 18, 2016), XP011606934.

International Search Report issued by the International Searching Authority for corresponding International Patent Application No. PCT/EP2018/061938, dated Jul. 25, 2018.

Soundara-Pandian et al., "Lithium Alkaline Halides-Next Generation of Dual Mode Scintillators", IEEE Transactions on Nuclear Science, Apr. 1, 2016, pp. 490-496, vol. 63, No. 2, IEEE Service Center, NY, NY.

(56) References Cited

OTHER PUBLICATIONS

Wen et al. "Measuring the scintillation decay time for different energy deposited by [gamma]-rays and neutrons in a Cs2LiYCl6:Ce3+ detector" Nuclear Instruments & Methods in Physics Research, Section A: Accelerators, Spectrometers, Detectors, and Associated Equipment, Feb. 9, 2017, pp. 9-15, vol. 853, Elsevier BV, North-Holland, NL.

International Search Report for corresponding International Application No. PCT/EP2019/061977 dated Jul. 17, 2019.

Sudeep MITRA, "Time-Sequenced Prompt y Neutron Activation Analysis", Encyclopedia of Analytical Chemistry, 2009, pp. 1-16, John Wiley & Sons, Ltd.

International Search Report issued by the European Patent Office for International Patent Application No. PCT/ EP2021/054154, dated Oct. 26, 2021.

Blaj et al., "Optimal Pulse Processing, Pile-Up Decomposition, and Applications of Silicon Drift Detectors at LCLS", IEEE Transactions on Nuclear Science, Nov. 2017, pp. 2854-2868, vol. 64, No. 11, IEEE.

Födisch et al., "Digital high-pass filter deconvolution by means of an infinite impulse response filter", Nuclear Instruments and Methods in Physics Research A, Jun. 11, 2016, pp. 484-496, vol. 830, Elsevier B.V.

Georgiev et al., "Digital Pulse Processing in High Resolution, High Throughput Gamma-Ray Spectroscopy", IEEE Transactions on Nuclear Science, Aug. 1993, pp. 770-779, vol. 40, No. 4, IEEE.

Mitchell et al., "Neutron Detection With Gamma-Ray Spectrometers for Border Security Applications", IEEE Transactions on Nuclear Science, Aug. 18, 2010, pp. 2215-2219, vol. 57, No. 4, IEEE.

Pausch et al., "Neutron detection by measuring capture gammas in a calorimetric approach", Nuclear Instruments and Methods in Physics Research A, Sep. 8, 2010, pp. 374-380, Elsevier B.V.

Scoullar et al., "Real Time Pulse Pile-up Recovery in a High Throughput Digital Pulse Processor", Applications of Nuclear Techniques, API Conf. Proc. 1412, 2011, pp. 270-277, American Institute of Physics.

Bjorn J Scholz, "First Observation Of Coherent Elastic Neutrino-Nucleus Scattering", arxiv.org, Cornell University Library, 201 Olin Library Cornell University Ithaca, NY 14853, (Apr. 2, 2019), doi:10.1007/978-3-319-99747-6, XP081163650.

Carter J et al, "Detectors for Gamma-Ray Burst Astronomy", Space Science Instrumentation,, (May 1, 1977), vol. 3, No. 2, pp. 123-129, XP001431870 Abstract Only.

International Search Report for PCT/EP2021/061467, Jan. 19, 2022.

\* cited by examiner

METHOD FOR DETERMINING THE NEUTRON FLUX BY USING A PORTABLE RADIONUCLIDE IDENTIFICATION DEVICE (RID) COMPRISING SCINTILLATION MATERIAL WITH IODINE

CROSS REFERENCE TO RELATED APPLICATIONS

This application is a continuation of International Application No. PCT/EP2020/055875, filed Mar. 5, 2020, the contents of which are incorporated by reference herein.

FIELD OF THE INVENTION

The invention relates to a method for determining the neutron flux by utilizing a portable Radionuclide Identification Device (RID) as used in homeland security applications.

BACKGROUND

Such devices are known in the art and there are norms available for such portable RID's, i.e. ANSI 42.34 and ANSI 42.53, the latter for a backpack-based-radiation-detection-system. For the sake of clarity, such backpack-based systems are deemed to be portable RIDs in the framework of this patent also, even if some voices in the literature distinguish those devices from smaller hand-held RIDs.

Neutron tests in RIDs require a minimum time to alarm for a given scenario in which a neutron source either rapidly pops up from behind a shield or moves by at a certain distance. ANSI 42.34 for example does require an alarm by the RID within 1 s after the test point, that is the distance of closest approach of the source, moves past the RID, the test point moving with a speed of 0.5 m/s. These requirements together with the terrestrial neutron background count rate determine the sensitivity, optimum algorithm and parameters for the neutron detection. Therefore, presently available RIDs do not only comprise a scintillation crystal—mostly NaI(Tl) or CsI(Tl) crystals—but a separate neutron detector in addition, which is usually a separate tube filled with $^3$He. The requirement to use an additional detector makes the RID more complex, expensive and error sensitive.

It is known in the art to use Natrium-Iodide (NaI) or Cesium-Iodide (CsI) crystals, usually doped with Thallium (Tl) to also detect neutrons. Such a system is described in Bartle and Haight, Nucl.Inst.Meth. A422(1999) 54-58. Therein it is described that the pulse shape pattern of reaction products, following (n,p), (n,α) or (n,d) reactions with high energetic neutrons of up to 200 MeV and higher is a function of the neutron energy, whereas the neutron energy has been determined by the time of flight of the neutrons. This document does not provide a method of how to measure the flux of thermal neutrons, i.e. neutrons with energies of less than 10 MeV. A further disadvantage is that the measurement results cannot be corrected for background radiation and that the evaluation of measurement data happens downstream, i.e. not before the measurement has been completed. The latter has the consequence that the neutron flux can be determined retroactively only whereas a portable RID has to detect a neutron flux above a certain threshold quickly, if not instantaneous.

Pausch et al describe a neutron detection device in WO2011/012155A1. This device utilizes a gamma radiation detector, comprising a spectroscopic gamma ray scintillator crystal. This scintillator is surrounded by a neutron absorbing material with a high cross section for thermal neutrons, said material releasing the energy deployed therein by the neutrons mainly via gamma radiation. This gamma radiation is then detected by the gamma ray scintillator. Background radiation is not discussed in this disclosure.

Yakushev et al, Nucl.Inst.Meth. A848 (2017) 162-165, describe a method to detect neutrons with iodine-containing detectors. They make use of the neutron capture reaction, where a neutron is captured by an $^{127}$I isotope. About 40% of the de-excitation pass through the 137.8 keV level, decaying with a half-life of $T_{1/2}$=845 ns via a series of low energy transitions. Neutrons are identified by utilizing a delayed coincidence measurement with this low energy γ-radiation. As the coincidence count rate is very low, NaI(Tl) crystals with 10 to 100 kg are used in fixed setups which cannot be used for portable detectors.

Another approach to detect neutrons with large and non-portable NaI(Tl) crystal based detectors, namely portal detectors for border control, is discussed by Holm et al, Nucl.Inst.Meth. A697 (2013) 59-63. The main aspect of this paper is the design of a neutron to gamma converter for the use in combination with NaI(Tl) crystals. The use of a NaI(Tl) detector is, apart from other disadvantages, not suitable when there is a high photon exposure at the same time.

It is therefore an object of the invention to provide a method for measuring the neutron flux with portable RIDs and a portable RID detector system which is capable to reliably detect thermal neutrons and which is technically less complex than the systems known in the art.

SUMMARY

A method is described in which the comparably low count rate of neutron induced (capture) events in small spectroscopic gamma ray scintillator crystals like NaI or CsI for portable RIDs can be used for the quick detection of the neutron flux, thus allowing the RID to issue an alarm in time and as requested by the applicable norms. Such small crystals used in portable RIDs mostly have a size in the order of 2×2 inch (5.08×5.08 cm).

Thermal neutrons are captured in the crystal by an iodine nucleus, namely by an $^{127}$I isotope, which releases the deposed energy mostly via high energetic gamma radiation, which is then detected in that same crystal. As the number of captured neutrons in a small crystal in a portable RID is comparably low, a high neutron flux is necessary to produce a signal strong enough to distinguish from background radiation. A further problem is that the background radiation varies as a portable RID, other than a stationary installation, may be used in different surroundings with different background radiation.

The present disclosure provides a method to correct the measured data comprising both, neutron and background radiation induced events, by determining the background radiation with the same detector during the ongoing measurement and correcting the measured data accordingly. For the sake of clarity and as long as not described otherwise explicitly, 'event' in the context of this patent shall mean an radiation induced interaction with the crystal finally leading to an emission of light, the amount of which is proportional to the energy deposed in the crystal and which is measured by a standard light detector known in the art. This includes both, the interaction of gamma radiation entering the crystal from outside ('gamma event') and the interaction of gamma radiation with the crystal following a reaction—mainly capturing—between a particle like a neutron ('neutron event'), proton ('proton event'), muon ('muon event') or the like with the crystal. 'Crystal' is, as long as not mentioned otherwise, used herein as a shortcut for 'spectroscopic gamma radiation crystal' used in RIDs.

More specifically, this problem is solved by a method for determining the neutron flux, utilizing a portable Radionuclide Identification Device (RID) as it is used in homeland security applications, comprising an inorganic crystal, said crystal comprising iodine, a light detector and electronics for the evaluation of the output signals of the light detector, the method comprising the following steps: detecting light emitted by the crystal, following the interaction of nuclear radiation with the crystal, with the light detector, whereas the intensity of the light measured is a function of the energy deposited in the crystal by said nuclear radiation during the interaction with the crystal, determining the energy deposited in the crystal by an interaction (event) by evaluating the output signal of the light detector, preferably by applying a standard pulse height evaluation. Then, a first group of events is selected by selecting those events, having deposited an energy in the crystal above a first pre-determined threshold $E_{T1}$, whereas the first threshold $E_{T1}$ is high enough so that the majority of events measured in that group originate from the interaction between high energetic cosmic radiation like muons ($\mu$) with the crystal. A second group of events is selected by selecting those events having deposed an energy in the crystal above a second threshold $E_{T2}$ and at the same time below a third threshold $E_{T3}$, whereas the second threshold $E_{T2}$ is higher than the maximum energy deposited by gamma radiation $E(\gamma)_{max}$ to be measured and lower than the third threshold $E_{T3}$, and whereas the third threshold $E_{T3}$ is lower than or equal to the first threshold $E_{T1}$ so that $E_{T2}$ and $E_{T3}$ define a window $W(n,\mu)$ in the energy domain. The count rate WO of the first group of events and the count rate $R(n,\mu)$ of the second group of events are determined. The background count rate R(back) is then determined by using the expected count rate $R(\mu)_{exp}$ of interactions of the cosmic radiation with the crystal in the energy range of the window $W(n,\mu)$, said expected count rate $R(\mu)_{exp}$ being calculated from the count rate $R(\mu)$ and the known energy distribution of high energetic cosmic radiation. Finally, the count rate R(n) is determined by subtracting the background count rate R(back) from the count rate $R(n,\mu)$, the count rate R(n) being a measure for the neutron flux. The crystal maybe selected from a group of sodium iodine and cesium iodine.

As cosmic radiation, especially muons, dominate in the energy range above 10 MeV, it is advantageous to set the first threshold $E_{T1}$ to 10 MeV. Gamma radiation emitted by natural decay processes has energies mostly below about 2.6 MeV, which is true for the sum energy of coincident gamma radiation events also. It is therefore an advantage to set the second threshold $E_{T2}$ to 3 MeV. In order to distinguish between thermal neutrons, being captured mostly by iodine nuclei, namely $^{127}$I nuclei, in the crystal, the excited states of which decaying by emitting gamma radiation with a total energy of mostly well below 10 MeV, it is advantageous to set the third threshold $E_{T3}$ to 5 MeV so that the window $W(n,\mu)$ between the second and the third threshold is well separated from the area with energies above the first threshold of preferably 10 MeV.

The results for the neutron flux, i.e. the neutron count rate, are even better when the count rate R(back) is further corrected by adding the count rate of pileup events $R(n,\mu)_{pileup}$ within the window $W(n,\mu)$. Said count rate of pileup events $R(n,\mu)_{pileup}$ maybe calculated by multiplying the calculated pileup count rate $R(n,\mu)_{sum}$ in the window $W(n,\mu)$ with the mean count rate r and the pulse pair resolving time $t_{pp}r$, whereby the count rate of pileup events $R(n,\mu)_{sum}$ may be calculated from the count rate of events built by the sum of two consecutive random events in the window $W(n,\mu)$.

As required for some applications, it is an option to generate an alarm when the count rate R(n) is increasing above a threshold, said threshold being calculated from the actual background count rate R(back), within a predetermined time.

In addition, a portable radionuclide identification device (RID) is disclosed, comprising at least an inorganic crystal, said crystal comprising iodine, a light detector and electronics for the evaluation of the output signals of the light detector, where the electronics is set to evaluate signals being equivalent to energies deposited in the crystal of more than 5 MeV, preferably more than 10 MeV and that the RID is set to conduct a method for determining the neutron flux according to one or more aspects of the method described above.

BRIEF DESCRIPTION OF THE DRAWING

An embodiment of the invention is described, referring to FIG. 1 showing a measured background spectrum in the energy domain ('energy spectrum') with an extended energy range up to 1 GeV, and FIG. 2 showing two measured spectra in the energy domain with an extended energy range of up to 100 MeV, namely a background spectrum with and without additional neutron source.

DETAILED DESCRIPTION OF THE PREFERRED EMBODIMENTS

Figure 1:
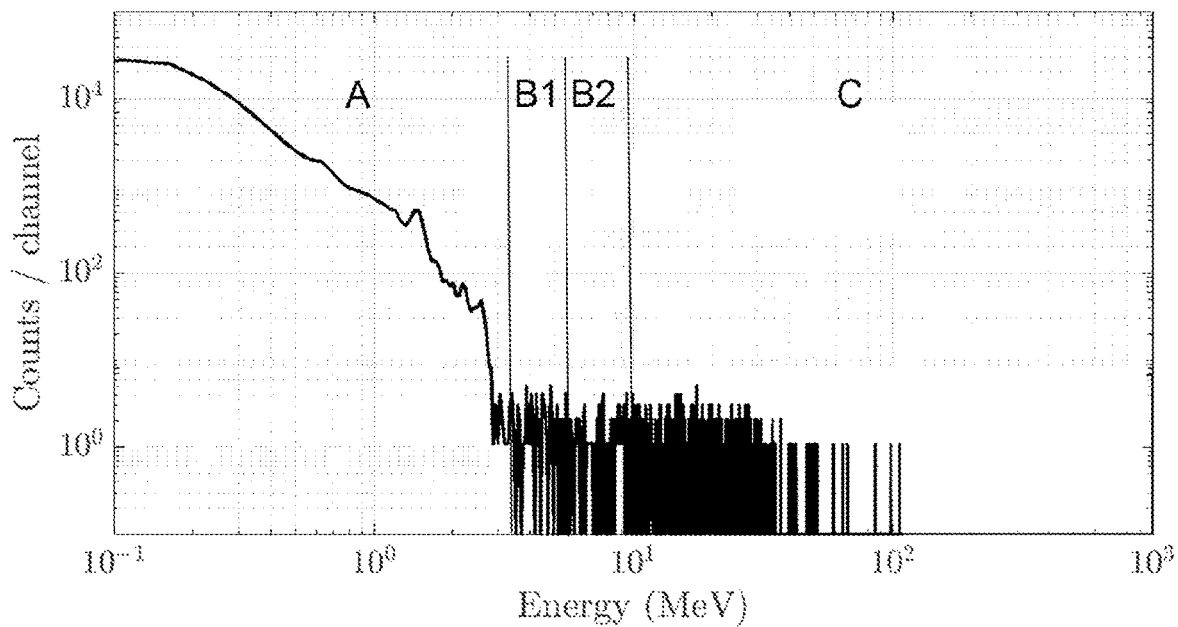

The inventor found that the relevant events can be separated into three regions of interest (ROI), separated by the energy deposited in the crystal. The first ROI—ROI($\gamma$)— covers energies up to 2.6 MeV. In this region, events originating from external gamma radiation (gamma events) dominate. It is the main purpose of an RID to evaluate those gamma events and to determine the origin of the gamma radiation source on the basis of the energy and the distribution of said gamma events. Other than a detector used for example in nuclear research, an RID only needs to detect gamma events originating from natural sources. Embodiments of the invention therefore makes use of the fact, that there is more or less no gamma radiation from natural sources, i.e. from decaying nuclei, with gamma energies of more than 2.6 MeV. Being more exact, the highest gamma energy expected from such sources is $E(\gamma)_{max}$=2,615 MeV (2.615 keV). The inventor also found that the sum energies, that is the sum of one or more gamma quanta being emitted from excited states coincidently, of gamma events from relevant coincident decays, i.e. from $^{60}$Co or $^{137}$Cs, is smaller than 2.6 MeV also when originating from natural sources.

As a consequence, an event with energies above 2.6 MeV, preferably above 3 MeV, measured by an RID, can be treated as not originating from external gamma radiation, but from heavy particles like neutrons, protons or muons, interacting with the crystal only. In order to be able to evaluate events with energies above 2.6 MeV, the electronics controlling the RID needs to be modified in a first step, enabling the RID to detect and to evaluate events with energies above 2.6 MeV. A standard RID is not set accordingly as the crystal is only used to detect gamma radiation events from natural sources, i.e. events with energies lower than 2.6 MeV.

Some neutrons will be captured by the iodine nuclei present in the crystal. This will lead to excited states in iodine which will decay to ground level by emitting gamma radiation, said gamma radiation having sum energies starting at around 2.6 MeV, mostly in the energy range between 3 and 8 MeV with a significant peak between 3 and 5 MeV.

The mean energies of muons at the earth's surface is around 4 GeV. Those muons will deposit an energy in the order of 4 MeV/cm in the crystal. For a diagonal trajectory in an 5×5 cm NaI crystal, the maximum energy deposed would be in the order of 28 MeV. However and due to other effects, muons will deposit up to 200 MeV of energy in the crystal ('muon energy' $E(\mu)$).

As a consequence, events with measured energies of $E_{T1}$=10 MeV and above are more or less solely events, originating from interactions between cosmic radiation—mainly muons ($\mu$)—and the crystal, whereas events with energies above $E(\gamma)_{max}$=2,615 MeV and below $E_{T1}$=10 MeV may originate from either neutron events or muon events. Those thresholds define the next two ROIs of relevance here: ROI($\mu$) is the region above event energies of 10 MeV, that region dominated by interactions of muons with the crystal. The third ROI, ROI(n,$\mu$), ist the region between a second threshold $E_{T2}$ and a third threshold $E_{T3}$, $E_{T2}$ being larger or equal $E(\gamma)_{max}$ and a third threshold $E_{T3}$, being lower or equal the first threshold $E_{T1}$ but higher than $E_{T2}$.

In the present embodiment, $E_{T1}$ is set to 10 MeV, $E_{T2}$ to 3 MeV and $E_{T3}$ to 5 MeV. FIG. 1 shows the resulting energy spectrum measured overnight without a radiation source, using a RID with a NaI(Tl) crystal, the crystal having a standard size of 2×2 inch and set to detect and evaluate events with energies up to 1 GeV. The region with energies above $E_{T1}$=10 MeV, ROI($\mu$), is marked with C. The ROI(n, $\mu$) region between $E_{T2}$ and $E_{T3}$ is marked with B1 and covers the region between $E_{T2}$=3 MeV and $E_{T3}$=5 MeV, the gap between 5 and 10 MeV is marked with B2. Setting such a gap ensures a clear separation of the events.

The events below $E_{T2}$=3 MeV are gamma events, resulting from background radiation.

Figure 2:
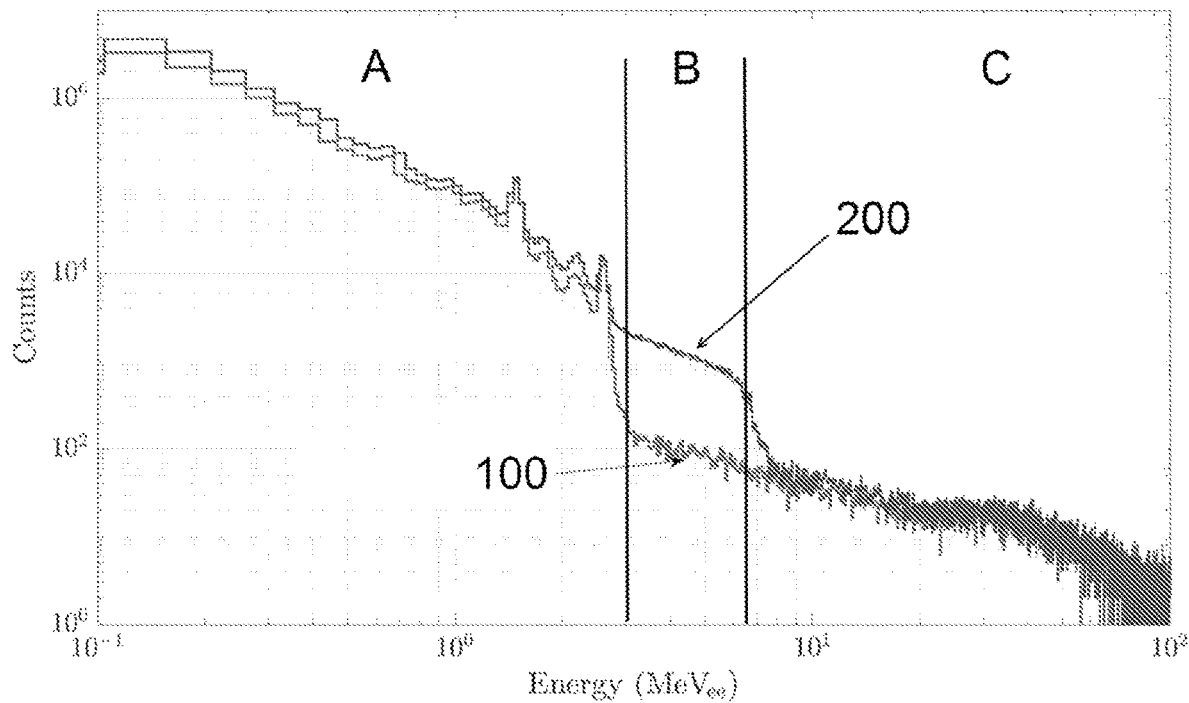

FIG. 2 shows two measured spectra with an RID, comprising a 2 inch×2 inch NaI(Tl) crystal, set to detect and evaluate events with energies up to 100 MeV. Spectrum 100 is again a spectrum showing the background radiation, whereas spectrum 200 shows a background spectrum with a neutron source present in addition. Region A in FIG. 2 again covers energies up to 3 MeV, therefore showing the background gamma events. Region C, the ROI($\mu$), covers energies between about 7 MeV and 100 MeV, i.e. the region where cosmic (muon) radiation begins to dominate. Region B between 3 MeV and about 7 MeV is covering the neutron capture region, where cosmic radiation is present in addition, i.e. the region ROI(n,$\mu$).

It can be seen from FIG. 2 that the count rates in regions A and C are more or less identical in the two spectra 100 and 200, whereas a significant difference can be seen in region B. The events measured in region B are, as far as the background of spectrum 100 is concerned, cosmic muons and, in spectrum 200, the sum of neutron- and muon-events.

It has to be mentioned further that the spectrum shown in FIG. 2 has been collected over several hours, therefore providing good statistics which allows to clearly distinguish between spectra 100 and 200 in region B—ROI(n,$\mu$). During real measurements with an RID, the RID has to issue an alarm within seconds and therefore has to use spectra with significant fewer events. As a consequence, spectra 100 and 200 would hardly be distinguishable if compared like in FIG. 2.

In order to quickly determine the neutron count rate as required for an RID in a spectrum measured like spectrum 200, the measured count rate has to be corrected by the background count rate, i.e. the muon count rate.

As an RID is to be used in different surroundings with changing background count rate, it is not possible to determine the background radiation in advance in a separate measurement as one would do in a laboratory or when using a non-portable detector. Therefore, the total height of the muon induced background events in ROI(n,$\mu$) is, like the corresponding background count rate R(n,$\mu$), unknown, as they are dependent at least from the position of the RID and the time in the year, as the muon intensity is varying over the year.

Embodiments of the invention make use of the fact that the energy distribution of the muons interacting with the crystal is known and can be calculated for the region ROI(n,$\mu$) for each crystal. The events within ROI($\mu$) are deemed to be muon events only. The same is true for the respective count rate R($\mu$). With the knowledge of the number of muon events in ROI($\mu$) over a predetermined time—the muon count rate R($\mu$) in ROI($\mu$)—and the muon energy distribution in the NaI(Tl) crystal used, the number of expected muon events in ROI(n,$\mu$) over time—the expected muon count rate R($\mu$)$_{exp}$ in ROI(n,$\mu$)—can be calculated. Subtracting this number from the total count rate R(n,$\mu$)$_{total}$ of events in ROI(n,$\mu$) provides the number of neutron events over time, i.e. the neutron count rate R(n) which is a measure for the actual neutron flux:

$$R(n)=R(n,\mu)_{total}-R(\mu)_{exp} \quad (1)$$

As the detection efficiency for neutrons can be easily determined for a specific RID in advance, the actual neutron flux can be determined from the measured neutron count rate R(n). The RID according to this embodiment will issue an alarm as soon as the neutron count rate R(n) increases above a predetermined value.

The measurement of the neutron count rate R(n) can be further improved when pileup information is taken into account also. Known means against pileup are count rate limitation and a tight pileup rejection with minimum pulse pair resolution time $t_{ppr}$, but there will still be an inevitable statistical pileup which cannot be avoided completely.

The RID of the preferred embodiment is using state of the art pulse processing for the evaluation of the events measured, namely pulse height discrimination (PHD) for distinguishing gamma radiation from neutron capture events from other events. When the count rate of events is high, pulse pile up may occur so that pile up events originating from several different gamma events within a small time window, so called random coincidences, may look like events with higher energies. Some of those will increase the number of events in ROI(n,$\mu$) without originating from interactions with neutrons and/or muons, thus increasing the measurement error.

The inventor used statistical considerations, making use of the fact that the emission of gamma quanta is Poisson distributed. A pileup occurs when the time between two pulses is shorter than the pulse pair resolving time $t_{ppr}$ of the detector, here the portable RID. In order to estimate the pileup rate in the neutron capture region, that is in ROI(n,$\mu$), one has to know the total (artificial) coincidence probability and the sum spectrum energy distribution.

This pileup can be estimated by creating an artificial sum spectrum from the measured gamma events. This sum spectrum is set up by adding the energies of two consecutive events and creating a new spectrum from those summed up events only. The rate of sum events measured in ROI(n,μ), that is the rate of sum events with $E_{T2}<E_\gamma(sum)<E_{T1}$, is $R(n,\mu)_{sum}$. A good estimation of the rate of false pileup events caused by statistical pileups in the region ROI(n,μ)—$R(n,\mu)_{pileup}$—can be calculated by scaling that rate of sum events by r $t_{ppr}$, r being the mean count rate:

$$R(n,\mu)_{pileup} = R(n,\mu)_{sum} * rt_{ppr} \quad (2)$$

In order to further correct the measured count rate of neutron events, it can be further corrected by taking the estimated pileup count rate within ROI(n,μ) into account also:

$$R(n) = R(n,\mu)_{total} - (R(\mu)_{exp} + R(n,\mu)_{pileup}) \quad (3)$$

It has to be mentioned that both, $R(n, \mu)_{sum}$ and r, are obtained from actual measurement data during the measurement in real time so that this further correction is accurate and adapted to the actual measurement situation.

Whereas embodiments of the invention relate to the evaluation of events with energies above $E(\gamma)_{max}$, it goes without saying that the portable RID described herein is at the same time capable of measuring gamma radiation with energies below $E(\gamma)_{max}$ and to evaluate those in order to identify the radionuclides being the source of said gamma radiation. Those events lying in the ROI(γ) are evaluated in parallel according to standard evaluation methods for gamma radiation detected with RIDs so that the detection and identification of gamma radiation will occur in completely parallel to the measurement of the neutron flux.

One big advantage of embodiments of the inventive methods is that they work with a standard RID without a separate neutron detector. It is therefore possible to enable existing RIDs without neutron detection capability by adding such a neutron detection capability without hardware modification. A software update, implementing the disclosed method, may be sufficient.

At the same time, the inventive method is not limited to those standard RIDs. It may also be used to improve already available neutron detection by combining the measurement results. This is especially true when a scintillator, comprising iodine, is used in combination with a surrounding neutron absorbing material as known in the state of the art, that material capturing neutrons and emitting gamma radiation which is then used to detect the neutron radiation. Any such capture material with a (n,γ) reaction, for example $^6Li$, may be used. Such a neutron absorbing material may also be placed within the crystal itself, which is sometimes the case with $^6Li$.

What is claimed is:

1. A method for determining neutron flux by utilizing a portable Radionuclide Identification Device (RID) wherein the RID comprises an inorganic crystal, a light detector and electronics adapted to evaluate the output signals of the light detector, the method comprising:
    detecting light emitted by the crystal based on events that comprise radiation induced interactions with the crystal using the light detector, wherein the light detector measures an intensity of the light as a function of energy deposed in the crystal by said events;
    determining the energy deposed in the crystal by evaluating a pulse height of the output signal of the light detector;
    selecting a first group of said events in a first energy window, wherein the first energy window comprises events having energies that exceed a minimum first threshold energy, $E_{T1}$;
    selecting a second group of said events in a second energy window, W(n,μ),
    wherein the second energy window comprises events having energies above a second threshold energy, $E_{T2}$, and below a third threshold energy, $E_{T3}$, and wherein $E_{T3}$ is less than or equal to $E_{T1}$;
    determining a count rate R(μ) of the first group of said events,
    determining a count rate R(n,μ) of the second group of said events,
    determining, for each measurement for determining neutron flux, a background count rate R(back) from an expected count rate $R(\mu)_{exp}$ of interactions of the cosmic radiation with the crystal in the second energy window W n,μ), wherein said expected count rate $R(\mu)_{exp}$ is being calculated from the count rate R(μ) and a known energy distribution of cosmic radiation; and
    determining a neutron flux count rate R(n) by subtracting the background count rate R(back) from the count rate R(n,μ).

2. The method of claim 1, wherein the crystal is selected from a group of sodium iodide and cesium iodide.

3. The method of claim 1, wherein the first threshold energy is 10 MeV.

4. The method of claim 1, wherein the second threshold energy is 3 MeV.

5. The method of claim 1, wherein the third threshold energy is 5 MeV.

6. The method of claim 1, wherein the count rate R(back) is further corrected by adding a count rate of pileup events $R(n,\mu)_{pileup}$ within the second energy window W(n,μ).

7. The method of claim 6, wherein the count rate of pileup events $R(n,\mu)_{pileup}$ is calculated by multiplying a calculated pileup count rate $R(n,\mu)_{sum}$ in the second energy window W(n,μ) with a mean count rate r and a pulse pair resolving time $t_{ppr}$.

8. The method of claim 7, wherein the expected count rate of pileup events $R(n,\mu)_{sum}$ is calculated from a count rate of events built by the sum of two consecutive random events in the second energy window W(n,μ).

9. The method of claim 1, wherein an alarm is generated when the neutron flux count rate R(n) increases above a threshold rate within a predetermined time, said threshold rate being calculated from the actual background count rate R(back).

10. A portable radionuclide identification device (RID), comprising an inorganic crystal, a light detector, and electronics adapted to evaluate the output signals of the light detector, characterized in that the electronics are adapted to evaluate signals being equivalent to energies deposited in the crystal of more than 5 MeV and that the RID is adapted to conduct a method for determining the neutron flux according to claim 1.

11. The method of claim 1, wherein $E_{T1}$ is defined such that, in the first energy window, a majority of the events originate from interactions with cosmic radiation.

12. The method of claim 1, wherein $E_{T2}$ is higher than a maximum energy deposed by gamma radiation $E(\gamma)_{max}$ to be measured.

* * * * *